United States Patent
Sikstrom et al.

(10) Patent No.: US 8,788,261 B2
(45) Date of Patent: Jul. 22, 2014

(54) METHOD AND SYSTEM FOR ANALYZING TEXT

(75) Inventors: Sverker Sikstrom, Stockholm (SE); Mattias Tyrberg, Malmo (SE); Anders Hall, Malmo (SE); Fredrik Horte, Hollviken (SE); Joakim Stenberg, Malmo (SE)

(73) Assignee: Saplo AB, Malmo (SE)

(*) Notice: Subject to any disclaimer, the term of this patent is extended or adjusted under 35 U.S.C. 154(b) by 635 days.

(21) Appl. No.: 13/126,583

(22) PCT Filed: Nov. 4, 2009

(86) PCT No.: PCT/SE2009/051250
§ 371 (c)(1),
(2), (4) Date: Apr. 28, 2011

(87) PCT Pub. No.: WO2010/053437
PCT Pub. Date: May 14, 2010

(65) Prior Publication Data
US 2011/0208511 A1 Aug. 25, 2011

Related U.S. Application Data

(60) Provisional application No. 61/111,031, filed on Nov. 4, 2008.

(51) Int. Cl.
*G06F 17/27* (2006.01)
(52) U.S. Cl.
USPC .............................. 704/9; 704/257; 704/255
(58) Field of Classification Search
USPC ............ 704/1–10, 251, 255, 257, 270, 270.1; 707/739; 1/1
See application file for complete search history.

(56) References Cited

U.S. PATENT DOCUMENTS

| | | | |
|---|---|---|---|
| 6,453,315 B1 * | 9/2002 | Weissman et al. | 1/1 |
| 6,847,966 B1 * | 1/2005 | Sommer et al. | 707/739 |
| 2003/0225749 A1 | 12/2003 | Cox et al. | |
| 2004/0059736 A1 | 3/2004 | Willse et al. | |
| 2007/0067157 A1 | 3/2007 | Kaku et al. | |
| 2008/0040321 A1 | 2/2008 | Baeza-Yates | |

FOREIGN PATENT DOCUMENTS

GB 2 391 967 A 2/2004

OTHER PUBLICATIONS

Peramunetilleke et al.: "Currency Exchange Rate Forecasting from News Headlines", Thirteenth Australasian database conference, 2001 [retrieved on Jan. 26, 2010], Retrieved from the internet: <URL: http://crpit.com/confpapers/CRPITV5Permaunetilleke.pdf>, Cited in ISR.
International Search Report, dated Feb. 12, 2010, from corresponding PCT application.

* cited by examiner

*Primary Examiner* — Huyen X. Vo
(74) *Attorney, Agent, or Firm* — Young & Thompson

(57) ABSTRACT

An apparatus for providing a control input signal for an industrial process or technical system having one or more controllable elements includes elements for generating a semantic space for a text corpus, and elements for generating a norm from one or more reference words or texts, the or each reference word or text being associated with a defined respective value on a scale, and the norm being calculated as a reference point or set of reference points in the semantic space for the or each reference word or text with its associated respective scale value. Elements for reading at least one target word included in the text corpus, elements for predicting a value of a variable associated with the target word based on the semantic space and the norm, and elements for providing the predicted value in a control input signal to the industrial process or technical system. A method for predicting a value of a variable associated with a target word is also disclosed together with an associated system and computer readable medium.

36 Claims, 11 Drawing Sheets

METHOD AND SYSTEM FOR ANALYZING TEXT

TECHNICAL FIELD

The present invention relates to computer processing of texts, in particular for predicting various variables. The invention also relates to an apparatus for providing a control input signal for an industrial process or technical system based on the semantic evaluation of given texts.

BACKGROUND ART

Today, in media, blogs, Internet Forums etc. across time, various entities e.g., organizations, companies, individuals, weather, crop production etc. are being valued and described based upon semantic dimensions, such as "creative", "trustworthy", "innovative", "warm", "high", "bad" etc. This is of great interest, for example when estimating opinion polls, estimating future weather conditions, possession of a television (or basically any variable that may be estimated), based upon what is written in the media, on the Internet or in a set of questionnaire answers. Currently, information retrieved from texts is often collected through manual reading and subjective estimates of small samples of relevant texts published in media. This is done either by experts in the relevant field, e.g. by market analyzers, meteorologists etc., or by opinion polls conducted by written or oral questionnaires.

However, such opinion polls and questionnaires introduce some problems which include subjectivity, since people making subjective evaluative judgments of texts are known to be influenced by several variables, including prior life experiences, type of questions asked, the setting that the questions are being asked in, information provided just prior to the question and so forth.

Moreover, usually only small text samples are included as people have a limited ability or time to read or acquire information, which means that an evaluation and a subsequent conclusion may be based on insufficient information. Another problem is that few evaluative dimensions are studied since current opinion polls have a limit in the number evaluative questions that can be asked.

Further, evaluative judgments of today often are processed manually, leading to large cost for collecting this information. Other difficulties include studying changes across time since opinion polls have to be taken at the time which is being studied. Therefore it is not possible to study evaluations occurring earlier in time making it difficult to graphically track changes in evaluations.

Also, in today's globally networked society, an incredible amount of text is produced at an ever increasing rate by various distributed text sources. The semantic contents of such texts are important to various industrial processes and technical systems which in some way deal with or depend on the behavior and opinions of a group or population of human individuals. However, it is believed that an automated and efficient approach for deriving control data input to industrial processes and technical systems based upon the semantic contents of distributed text sources has hitherto not been available.

Accordingly, there is a need for the possibility of efficiently extracting information from a number of texts. Automated systems for measuring e.g. valence (which refers to the number of arguments controlled by a verbal predicate) are known although these systems do not allow for such measure across time.

One automated system for measuring the valence of single words was accomplished by first creating a so called semantic space of a text corpus. Then a set of positive and a set of negative words were collected from word norms and the valence of a word was estimated by measuring, in the semantic space, the distance between this word and the set of positive and a set of negative words respectively.

Another automated system measures the valence of news headlines. Here semantic spaces were first created and the headlines of newspapers articles were summarized by averaging the words in the headlines in the semantic space. Eight positive words and eight negative words were also summarized by averaging the representation of these words in the space. The valence of the headlines was estimated by, in the semantic space, measuring the distance between the summary of the headlines and the summary of the positive and negative words respectively.

In the patent literature, there are several purposes and techniques for processing and analyzing text. US 2004/0059736 A1, for example, includes means for determining a concept representation for a set of text documents based upon partial order analysis and modifying this representation if it is determined to be unidentifiable. Furthermore, described is also means for labeling the representation, mapping documents to it to provide a corresponding document representation, generating a number of document signatures each of a different type, and performing several data processing applications each with a different one of the document signatures of differing types.

US 2007067157 A1 describes a phrase extraction system that combines a dictionary method, a statistical/heuristic approach, and a set of pruning steps to extract frequently occurring and interesting phrases from a corpus. The system finds the "top k" phrases in a corpus, where k is an adjustable parameter. For a time-varying corpus, the system uses historical statistics to extract new and increasingly frequent phrases. The system finds interesting phrases that occur near a set of user-designated phrases, uses these designated phrases as anchor phrases to identify phrases that occur near the anchor phrases, and finds frequently occurring and interesting phrases in a time-varying corpus is changing in time, as in finding frequent phrases in an on-going, long term document feed or continuous, regular web crawl.

Even though known techniques fulfill their respective purpose, there is no possibility to make evaluation in terms of predicting a variable of choice that is related to a given word or words in a given text corpus.

SUMMARY OF THE INVENTION

In view of the foregoing, it is an object of the present invention to provide an improvement of the above techniques and prior art. More particularly, it is an object to provide a computer-implemented method and a system that allows for the prediction of a value of a variable, based upon the information contained in a text corpus. Also, one object of the invention is to provide an automated and efficient approach for allowing industrial processes and technical systems to be controlled by semantic contents appearing in various distributed text sources.

A first aspect of the invention is a method for predicting a value of a variable associated with a target word, performed on at least one computer and comprising the steps of: collecting a text corpus comprising a set of words that include the target word; generating a representation of the text corpus; creating a semantic space for the set of words, based upon the representation of the text corpus; defining, for a location in the semantic space, a value of the variable; estimating, for the target word, a value of the variable, based upon the semantic space and the defined variable value of the location in the semantic space; and calculating a predicted value of the target word, on basis of the semantic space, the defined variable value of the location in the semantic space and the estimated variable value of the target word.

Here, a "text corpus" is a large and structured set of texts which is typically electronically stored and which may be electronically processed. The text corpus may contain texts in a single language or text data in multiple languages, and is collected by using conventional, known methods and systems.

A "semantic space" is the result of a mathematical algorithm that takes a text corpus as an input and creates a high dimensional space, where the dimensions in the space correspond to semantic qualities, or features of the words in the corpus. For example, one dimension may represent whether the words represent something that is alive, whereas another dimension may represent to what extent the word represents an emotion. Synonyms are located close to each other in the space, and the distance between words is a measure of how semantically close the words are. The distance between two words is typically measured by the cosines of the angle between vectors representing the words, although other distant measures may also be used. Semantic spaces are created by using information of co-occurrence, and examples of algorithms for creating semantic spaces include the known Latent Semantic Analysis (LSA) and the random indexing (RI) method.

A location in the semantic space is a point in it which represents e.g. a word, but may also represent several words or even set(s) of keywords. Hence, the value of the variable may be defined for some or each word of a subset of words in the semantic space.

A "semantic dimension" is any judgment relating to the meaning (semantic) of a word (concept), such as positive or negative evaluations, trustworthiness, innovations, intelligence, etc.

An "external variable" is any quantitative information that is not directly represented in the semantic representation of the text corpus. However, information of these variables may be indirectly inferred from the text corpus by using this invention.

By context, or "semantic context", is meant the words that surround a target word in certain part of a text corpus, e.g. the fifteen words prior to and fifteen words after a target word represent the context of that word. Of course, any number of words prior to and after a target word may be used. The semantic context can be summarized by one location in the semantic space, and a target word has one semantic context for each occurrence in a text corpus.

By "keywords", which is a term used below, is meant a limited amount of words that best summarizes a larger set of words, or summarizes differences between two sets of words. Keywords can be ordered by how well they summarize the entities described above. For example, keywords describing this document may be "semantic spaces patent prediction" etc. In the context of the present invention, "keywords" can also be seen as a limited amount of words which have a semantically close distance to a location in the semantic space represented by a larger set of words.

By "target word" is meant a single literal word, a set of literal words (such as a phrase or sentence), or even an entire text made up of literal words, based upon which a variable shall be predicted. The variable to be predicted will be identical to the target word when the target word is an entire text. When the target word is a single literal word or a set of literal words, the variable to be predicted will be a limited or unlimited number of words before and after the target word. The target word can, but does not have to, be included in the variable to be predicted. When the target word is a single literal word, either the word itself or at least a part of its semantic context has to be included in the text corpus. On the other hand, when the target word is a set of words, it can be calculated as the average location of the words included in the set that are also present in the text corpus. In other words, when the target word is a set of words, at least one of these words (or at least a part of the semantic context thereof) must appear in the text corpus.

"Defining, for a location in the semantic space, a value of a variable" means calculating a reference point in the semantic space for at least one reference word or text, and associating this reference point with a defined value associated with the reference word or text. The defined value represents a property of the reference word or text expressed in a scale, which may be nominal, ordinal or relative (ratio scale). The defined value may be given manually (by a human user making judgments based on the reference word or text) or automatically (by software measuring physical properties of the reference word or text). A set of one or more such reference points with associated value(s) is also referred to as "norm" in the remainder of this document. The purpose of a norm is to serve as reference data for estimating a value of a variable associated with a target word. This provides the capability to build individual norms that mimic human or machine rankings. That is, a human or a machine creates (i.e., trains) a norm by ranking a text on a semantic dimension, and the invention mimics this ranking procedure on unranked texts.

It should be noticed that the final step of the method according to the first aspect, i.e. calculating a predicted value of the target word, does not have to be present in some aspects of the present invention.

The estimating of the target word variable value may comprise performing regression analysis having the target word variable value as a dependent variable.

The creating of the semantic space may comprise performing a singular value decomposition on the representation of the text corpus.

The method may further comprise the step of statistically testing the predicted value of the variable, by comparing different sets of the predicted values, or by comparing predicted values and known values.

The method may further comprise the step of statistically testing if two sets of words or two sets of documents of the text corpora differ in semantic representation. This method is based on the statistical technique called bootstrapping, where the distance in the semantic space between the word sets are compared under condition when the assignments to the groups are being made in a random or non-random fashion.

The collecting of the text corpus may comprise collecting time information associated with text in the text corpus.

The predicting of the value of the variable may comprise associating the predicted value with the time information of the text corpus.

The collecting of the text corpus may comprise collecting a relevance indicating measure associated with text in the text corpus.

The predicting of the value of the variable may comprise numerically weighting the value with the relevance indicating measure.

A second aspect of the invention is an apparatus for providing a control input signal for an industrial process or technical system having one or more controllable elements. The apparatus has means for generating a semantic space for a text corpus;

means for generating a norm from one or more reference words or texts, the or each reference word or text being associated with a defined respective value on a scale, and the norm being calculated as a reference point or set of reference points in the semantic space for the or each reference word or text with its associated respective scale value;

means for reading at least one target word;

means for predicting a value of a variable associated with the target word based on the semantic space and the norm; and means for providing the predicted value in a control input signal to said industrial process or technical system.

The apparatus may further comprise means for collecting said digital text corpus from a plurality of distributed text sources accessible via one or more networks.

In one embodiment, the apparatus according to the second aspect of the invention comprises a data processing unit configured to perform the method according to the first aspect of the invention.

According to another aspect of the invention, a system for predicting a value of a variable associated with a target word is described. The system comprises at least one computer and is configured to: collect a text corpus comprising a set of words that include the target word; generate a representation of the text corpus; create a semantic space for the set of words, based upon the representation of the text corpus; define, for a location in the semantic space, a value of the variable; estimate, for the target word, a value of the variable, based on the semantic space and the defined variable value of the location in the semantic space; and calculate a predicted value of the target word, on basis of the semantic space, the defined variable value of the location in the semantic space and the estimated variable value of the target word.

According to yet another aspect of the invention a computer readable medium is provided, having stored thereon a computer program having software instructions which when run on a computer cause the computer to perform the steps of: collecting a text corpus comprising a set of words that include the target word; generating a representation of the text corpus; creating a semantic space for the set of words, based on the representation of the text corpus; defining, a location in the semantic space, a value of the variable; estimating, for the target word, a value of the variable, based on the semantic space and the defined variable value of the location in the semantic space; and calculating a predicted value of the target word, on basis of the semantic space, the defined variable value of the location in the semantic space and the estimated variable value of the target word.

The inventive system and computer readable medium may, as described, comprise, be configured to execute and/or have stored software instructions for performing any of the features described above in association with the inventive method, and have the corresponding advantages.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above as well as additional objectives, features and advantages of the present invention will be better understood through the following illustrative and non-limiting detailed description of embodiments of the present invention, reference being made to the appended drawings in which.

DETAILED DESCRIPTION OF EMBODIMENTS

Embodiments of the present invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention.

The disposition of this detailed description is as follows.

First, a method for predicting a value of a variable associated with a target word, in accordance with the aforementioned first aspect of the invention, will be described with reference to FIGS. 1 and 2, explaining in detail the steps of the method and the terminology used. In conjunction with this, an associated system and an associated computer readable medium—having stored thereon a computer program—will also be described.

Then, with reference to FIGS. 3-7, there will be a detailed description of how the present invention will serve to provide an automated and efficient approach for allowing industrial processes and technical systems to be controlled by semantic contents appearing in various distributed text sources. Consequently, in accordance with the aforementioned second aspect of the invention, an apparatus for providing a control input signal for an industrial process or technical system having one or more controllable elements based on semantic evaluations of text will be described.

Finally, with reference to FIGS. 8-11, some technical implementations and use cases of the apparatus for providing a control input signal will be described.

* * *

Figure 1:
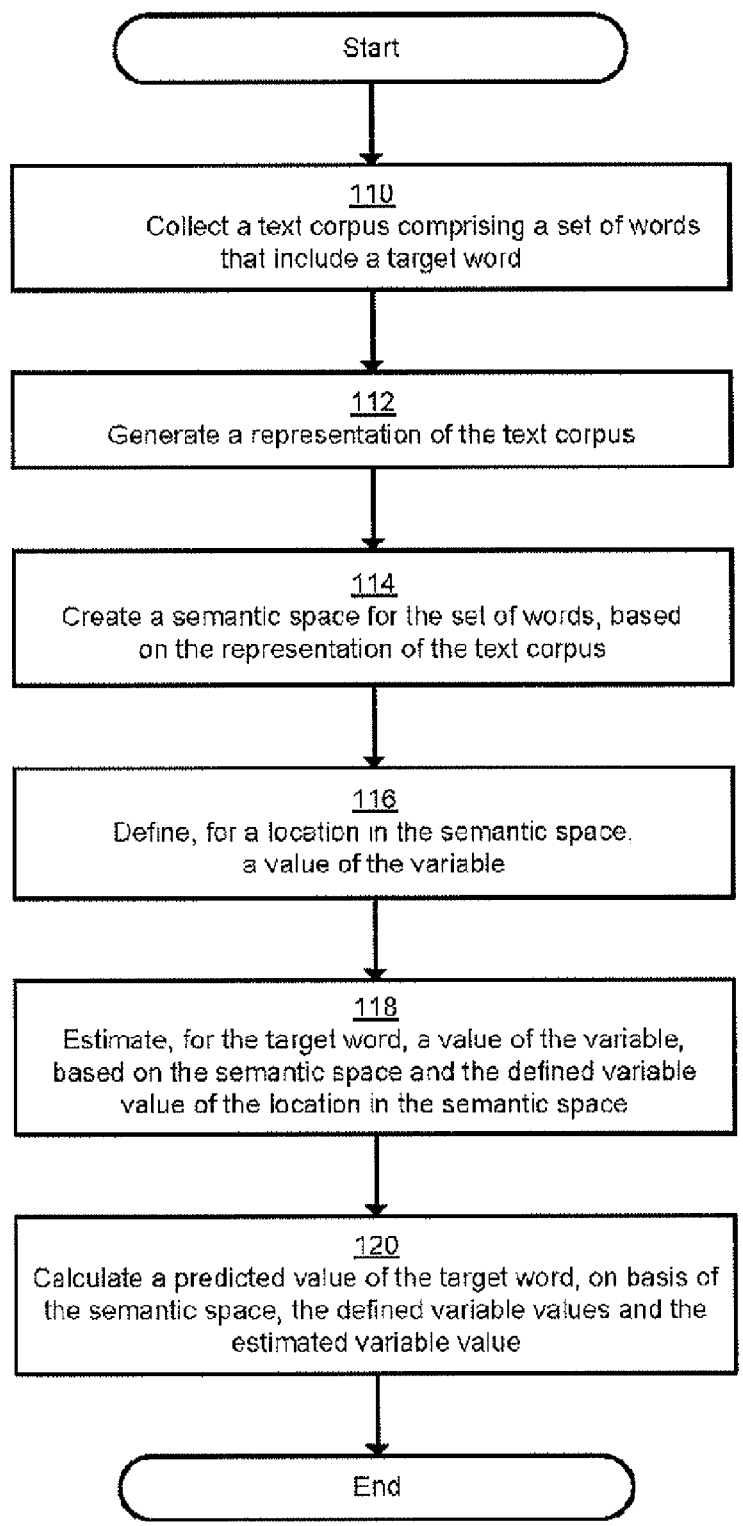
FIG. 1 is a flow diagram of the inventive method.

With reference to FIG. 1, the inventive method is described where predicting a value of a variable (external variable) is done by using a predictive model, which is an algorithm used to measure, or predict, the relation between the semantic space and the variable. For example, multiple linear regressions may be conducted using the semantic space as predictor for an external variable. The coefficients from this regression are then used as predictor for another text based dataset that are lacking values of the external variable. If, for example, the valence of all the words in a corpus should be predicted, the external variable is identified by manually ranking a subset of the words for valence on a scale from e.g. 0 to 10 (where something negative is ranked with a low value while something positive is ranked with a high value). The semantic representation of the ranked words is then used as predictor for the valence rankings by using multiple linear regressions. The outcome, or the regressor coefficients, is then used for making predictions of valence for words that have not been manually ranked.

In brief, the method automatically measures semantic evaluations across time in text corpus, predicts external variables based on texts, and allows statistical testing of whether two sets of texts differs in semantic contents. For example, this technology measures how words representing companies, organizations, people, brands, parties, presidents, movies, text produced by people in certain experimental conditions, etc. are evaluated on a number of semantic dimensions across time. Another example of this is invention is to predict changes in company sales based upon text corpora, measure whether two companies are statistically different in a semantic representation, sense which keywords best describe the difference between people in two different circumstances, etc.

The following steps are generally included: collecting 110 a large amount of text articles with time stamps from a database or Internet; generating a representation 112 of the text corpus and creating 114 a semantic space; defining 116 variable values for a set of the words of the text corpora; estimating 118 variable values for remaining words (or for only one target word), e.g. by regression analysis; and predicting 120 the variable(s) for the remaining (target) word(s), on basis of the defined as well as the estimated variable value(s) and the semantic space. Optionally the semantic information is statistically tested.

A text corpus can be provided from existing data, or may be available by automatically collecting time-stamped text articles. The text corpus is then collected by conventional, automatic search robots that scan the Internet, news databases, electronic sources or other collections of text. Time stamps for when the information was published on the net are also collected by searching for date strings in the texts or by identifying the time that the articles became accessible. In addition, estimates of the importance, or relevance, of the articles are also obtained, for example by tagging the number of downloads of a page or the number of visits at a web page to the text of that page or webpage.

Next a semantic space is created from the text corpus, for example by using Latent Semantic Analysis (LSA) or random indexing. Other equivalent algorithms that may transform words to distributed semantic representations may also be used. In brief, LSA first creates a table including words (rows) and local context (columns), where each table entry counts the frequency of the words in the local text context. Next, a semantic space is created by the known data compression algorithm called singular value decomposition (SVD) that reduces the large number of contexts to a moderate number of semantic dimensions. The quality of the semantic space can be measured by testing the semantic space on synonym word samples. In this invention the algorithm, the parameters settings and the distance measure that yields the best performance on such test are selected. The results of such an analysis (e.g. the parameter for the number of dimensions used, etc.) depend on the data corpus that is being used, and may therefore vary for different applications.

The semantic context for a word at a certain time is extracted, which includes identifying the semantic context of a specific word, such as a number of words before and after the word that is studied. This semantic context is summarized in the semantic space representation. Hence, for every occurrence of a word in the text corpus, there is a local context that is summarized by a location in the semantic space and is associated with the time that the text corpus was dated.

Thereafter information is extracted from the semantic space across time. This is done by e.g. measuring the distance between the word context and the word to be evaluated in the semantic space. Because each context typically (but not necessarily) has a time stamp the semantic evaluation can be plotted across time.

A keyword summary of how a word is described during a certain time period is generated, and the results are presented as keywords that best describes or summarizes what is written about an e.g. organization during a specific time period. A change in the description of, in this example, an organization may be detected automatically by measuring the distance in space for articles occurring prior and following a certain time period. In this way e.g. an alerting system can be created that informs users when new information is coming up.

The results can be visualized graphically. For example, the semantic dimensions can be visualized across time, or two or more semantic dimensions can be plotted against each other.

An external variable is then predicted based upon the semantic representation, where the variable is not directly represented in the text corpus. This includes collection of external variables, building a model describing the relation between the external variable and the semantic representation, and predicting the external variable.

In further detail, this is done by first collecting the external variable, which may vary across time. Examples of external variables include an amount of rainfall, cereal production levels, stock prices, opinion polls etc. The external variable may also not vary in time, which for example is the case regarding measurement of brain activity (as measured by event related functional MRI activity, EEG, PET, etc. so that the neural activity could be predicted from a word(s), or that the word(s)/thoughts can be predicted from the brain activity), performance on memory tests, how correct a statement is (for example testimony statements made in a court trial), ranking of semantic variables (i.e., valence, uncertainty, etc.).

Second a model for the relation between a target word(s) in a text corpus and an external variable is built. This allows for building predictive models describing the relation between articles and an external variable. This is conducted by known, suitable mathematical multidimensional optimization techniques, for example by using multiple linear regression where the dimensions in the semantic space are used as regressor for the external variable. However, other techniques for predicting the relation between the semantic space and an external variable may also be used; for example classifier, etc.

The multiple linear regression method is a known form of regression analysis in which the relationship between one or more independent variables and another variable, called dependent variable, is modeled by a least squares function, called linear regression equation. This function is a linear combination of one or more model parameters, called regression coefficients. A linear regression equation with one independent variable represents a straight line, and the results are subject to statistical analysis. In this context, conventional multiple linear regression is used.

Turning again to predicting the variable, the external variable is predicted based on the semantic representation. This analysis may be crucial for predicting on-going and future events, as well as analyzing cause and effects relations. It might e.g. answer the question whether media influences company sales or whether company sales influence the description of a company.

The predictions between the semantic content and an external variable are bi-directional. This means that the semantic content may predict an external variable, or an external variable may predict the semantic content. An example of the latter is that the external variable fMRI activity can be used to predict the thoughts that a person has at a given time.

Finally, statistical testing of the semantic information is performed. This includes statistical testing of difference in semantic representation, extraction of keywords summarizing difference between two set of texts, clustering of semantic representation, reliability and validity measures, which methods are described below.

Statistical testing of difference in semantic representation is a method that allows for statistical testing if two or more sets of contexts words, or sets of texts from different conditions, are statistically different in their semantic representation. This statistic testing is based upon first measuring the distance in the semantic space between the average locations (i.e. prototypes) of the two or more sets of words. This distance is compared to the distance when the texts are randomly assigned to the two sets. Statistics may then be calculated on this information using a bootstrap technique, a technique which is known within the art. This method may be applied to several applications, such as for statistically testing whether two competitive organizations are described differently during a certain time interval.

For extracting the difference in semantic content between two or more sets of contexts, or sets of texts, an additional method is required for studying the difference between two sets. This can be accomplished by subtracting the vectors describing set one from the vector describing set two. The words that are closest to the resulting vector are keywords that best describe set two. The words that are furthest from the resulting vector are keywords that best describe set one.

The measures described above may be further divided into articles on different topics related to the same organization. For example, an organization may in the financial section be described as having an increase in profit (high valence) at the same time as the organization is discussed in the media because they are discharging personnel for moving a production plant to a low cost country (low valence). These different topics are analyzed separately by applying algorithms that automatically divides articles into different topics, where each topic can be measured and analyzed separately. The known k-mean clustering algorithm is an example of a method that can be used to classify words or articles.

The validity of the prediction of an external variable can be measured by correlating the predicted estimate with the external variable, using data-points that were not included during training of the predictor model.

Moreover, the reliability of the method can be measured by randomly dividing the dataset (text corpus) into to independent dataset, and correlating the results for the two sets.

To exemplify, it is possible to predict valence (the external variable) for a company by a) selecting a relevant text corpus such as 100 000 news articles from year 2000 to year 2006, b) creating a semantic space using LSA, c) extracting context of the semantic space that includes the name of the company, d) manually ranking e.g. 300 words for valence on a scale from −3 to +3, i.e. how negative or positive humans judge words, e) building a predictive model on the external variable by using multiple linear regression, f) predicting valance across time, g) calculating the validity of the predictive model by correlating the predicted valence with the ranked valence for words not used in the regression, and h) calculating the reliability of the results by randomly dividing the text corpus into two independent subsets. To predict a change in a stock price for a company the changes in stock prices of that company may be predicted by subtracting a current stock price from the price one week in the future and estimating the changes in stock prices by training on the relation between changes in stock prices and the semantic space during the relevant time period and then using multiple linear regression.

For providing an example with numerical values the following text context (corpus) is considered:

document 1: Sun is shining (Jan. 1, 2008)
document 2: Sun is warm. (Jan. 2, 2008)
document 3: Warm is nice. (Jan. 3, 2008).

The first step is to create a semantic space. In this example LSA is used, but semantic spaces can also be created using several other methods, such as probabilistic latent semantic analysis, random indexing or ICA ("Independent Component Analysis"). First a context by word frequency table of the words included in our corpora is made, where the words are represented in the rows and the contexts in the columns, as indicated in table 1 below.

TABLE 1 word frequency table (matrix)

| Word | Contexts | | |
|---|---|---|---|
| | document 1 | document 2 | document 3 |
| Sun | 1 | 1 | 0 |
| Is | 1 | 1 | 1 |
| Shining | 1 | 0 | 0 |
| Warm | 0 | 1 | 1 |
| Nice | 0 | 0 | 1 |

In a word frequency table, high frequency words not containing any semantic information (e.g., "a" and "the") are not present. To improve performance, the frequency table may be normalized by taking the logarithm of the frequency, but this step is here omitted for simplicity. Each cell represents the number of occurrence of a word in the context. By context is meant either a document or subset of a document.

To create a semantic space a singular value decomposition (SVD) is conducted. The method of performing singular value decomposition is known within the field of linear algebra and is a standard package in e.g. the commercially available linear algebra package LAPACK or in the GNU Scientific Library.

The following variables are written in matrix notation, where x is the context by word frequency table (the frequency matrix of Table 1), u is the semantic space, and s is the singular values. The SVD decomposes the matrix x into a product of matrices according to:

$$x = u * s * v^T$$

where u, s and v can be calculated from x by applying the known algorithm of SVD:

$$[usv] = SVD(x)$$

The columns of u and v are made up from so called left- and right singular vectors respectively, while s is a diagonal matrix with diagonal elements consisting of singular values in descending order. Now an approximation of the original matrix x can be made by keeping a desired number k of the highest singular values of s and substituting the remaining diagonal elements with zero. Calling this new matrix s' we have $$x' = u * s'* v^T$$

In this case, only the first k columns of u contribute to x'. In a semantic sense, the rows of u represent the words. Each word is normalized to a length of 1 which is done by creating a vector of the first k elements in a given row of u and then dividing these elements by the length of this vector representing each word:

$$u_i' = u_i / \|u_i\|$$

where $u_i$ represents the semantic representation of word i and $\|u_i\|$ is the length of vector $u_i$.

The dimensions of u are ordered after how important they are in predicting x', so that the first dimensions are more important than the later dimensions. The dimensions represent features in the semantic space. To understand what features that are represented, it is necessary to make an interpretation of the dimensions. For example, Table 2 shows the first two dimensions of u':

TABLE 2 the normalized semantic space (u')

| Word | Dimensions | |
|---|---|---|
| | 1 | 2 |
| Sun | −.68 | −0.73 |
| Is | −1 | 0.00 |
| Shining | −0.39 | −0.92 |
| Warm | −0.68 | 0.73 |
| Nice | −0.39 | 0.92 |

Dimension 2 could be interpreted as how emotional the words are because the emotional words 'warm' and 'nice' have high values whereas the non-emotional words 'sun' and 'shining' have low values.

The local context for chosen words in the semantic space is then summarized.

For example the local context for 'sun' in document 1 are the words 'is' and 'shining'. This summary is made by averaging the corresponding vectors in the semantic space, and then normalizing the results so that the length of the resulting vector is one. For example, the average values of 'is' and 'shining' in the semantic space is [−0.83, −0.55], where this vector has been normalized to a length of 1.

The semantic space can now be used to make a prediction (P) of an external variable (V). For example, it may be predicted how concrete the words are. To do this, persons (a selection of people) first rank a subset of the words on concreteness, where 'sun' is ranked as concrete (a relatively high value of 2) and 'is' as less concrete (a relatively low value of 0), as may be seen in Table 3.

TABLE 3 the external variable (V) and the predicted external variable (P)

| Word | Dimensions | |
|---|---|---|
| | V | P |
| Sun | 2 | 1.4 |
| Is | 0 | −0.2 |
| Shining | 1 | 1.9 |
| Warm | −2 | −1.7 |
| Nice | −2.2 | −2.0 |

A prediction of concreteness (P) can now be made. This is done by using multiple linear regression, where we find the coefficients (R) that best describes the linear relation between the semantic space (u') and the external variable (V):

$$V \approx R * u'$$

Following the well known algorithm for solving multiple linear regression, R can be calculated by:

$$R = (u'^T u')^{-1} u'^T V$$

For example, when the linear regression is made on 'sun and 'is', the following coefficients are obtained R=[00−4] (where the first number represents a constant that is added to the prediction and the following numbers correspond to coefficients for dimension 1 and 2 respectively). The external variable (P) can then be calculated by the following formula:

$$P = R * u'$$

This formula can now be used to predict the last three words (that has not been trained). Table 3 shows the words in the corpora, the external variable V (ranked concreteness) and P (predicted concreteness). The correlation between predicted variable and external variable is 0.92 (although this is a high correlation, it does not significantly differ from 0 because the there are very few variables in the example).

The invention may also be used to predict a point, i.e. a location, in the semantic space based on several external variables (i.e., rather than predicting an external variable based on the semantic representation). For example, based on neural activation data (e.g. event related fMRI) it is possible to predict the word, or the semantic content that a person is processing.

This is done by using multiple linear regression, where we find the coefficients (R) that best describes the linear relation between dimension i in the semantic space ($u'_j$) and a set of external variables (V):

$$u'_j \approx R * V$$

Following the well known algorithm for solving multiple linear regression, R can in this case be calculated by:

$$R = (V^T V)^{-1} V^T u'_j$$

The predicted semantic representation of dimension j ($u'_p$) can then be calculated by the following formula:

$$u'_p = R * V$$

By repeating the multiple linear regression for the all the semantic dimensions in the space, it is possible to predict a point in space that best describes a set of external variables.

The invention may be implemented by using the linear algebra package LAPACK, or by using the GNU Scientific Library which is free software under the GNU General Public License and available for download from the Internet.

Although a more abstract variable has been predicted, variables like temperature, rainfall, data amount, output from various processes may be predicted just as well, which is quite useful since such predictions may be used to control or plan technical processes, watering of crops etc. etc.

The invention also includes the possibility of statistically testing whether two sets of words/contexts/documents are statistically different from each other. The statistics is based on the well known statistical method of boot strapping for calculating the probability that the groups differs in semantic representations. For example, testing whether word set 1 ('sun shining') differs in semantic content to word set 2 ('is warm place'). This is done in the following steps: (1) calculate the mean location in the space for set 1 ($u'_{1,i}$), where the subset i is the index representing the N words in the set) and set 2 ($u'_{2,i}$):

$$u'_{1,} = \sum_{i=1}^{N} u'_{1,i}$$

$$u'_{2,} = \sum_{i=1}^{N} u'_{2,i}$$

(2) Normalizing the vectors $u'_2$ and $u'_2$ so that their length is one (as described above).

(3) Calculate the distance (d) between the vectors representing the mean locations. Here we use one minus the dot product of the vectors as the distance measure:

$$d = 1 - u'_1 * u'_2$$

(3) Repeating steps 1, 2, and 3 while assigning the words randomly to set 1 and set 2. This repetition is conducted a large number of times (typically 10000 times). Then count the percentage of occasions when the distance for the randomly assigned words is larger than when the distance is based on the non-randomly assigned word groups. This percentage will constitute the p-value for whether set 1 and set 2 differ in semantic representation.

Figure 2:
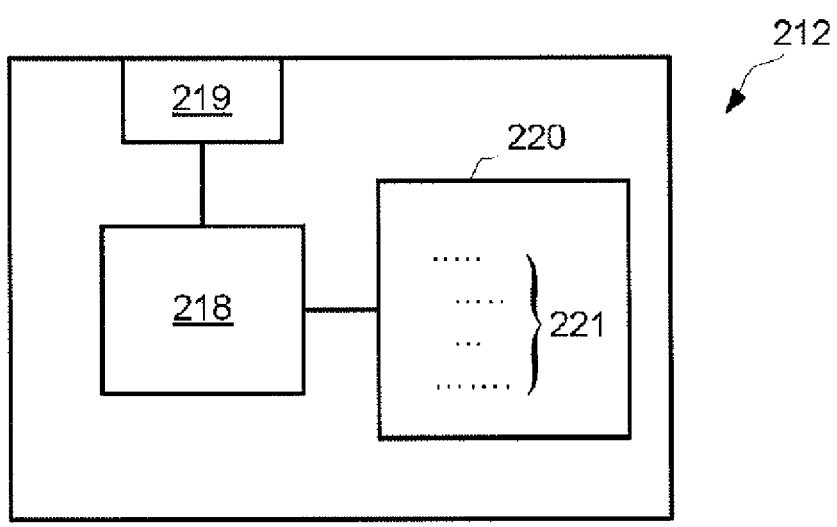
FIG. 2 is a computer implementation of the invention.

With reference to FIG. 2, a computer 212 implementing the invention is illustrated in more detail and comprises a processor 218 which is connected to a computer readable medium 220 having stored thereon a computer program 221. The computer program 221 comprises software instructions for causing the computer 212 to make the method steps performed by the computer 212 for the prediction system described herein. A communications interface 219 is also connected to the processor 218 for providing communication with a network and, optionally, a database on which the text corpora is stored.

* * *

With reference to FIGS. 3-7 and in accordance with the aforementioned second aspect of the invention, an apparatus for providing a control input signal for an industrial process or technical system having one or more controllable elements based on semantic evaluations of text will now be described.

Figure 3:
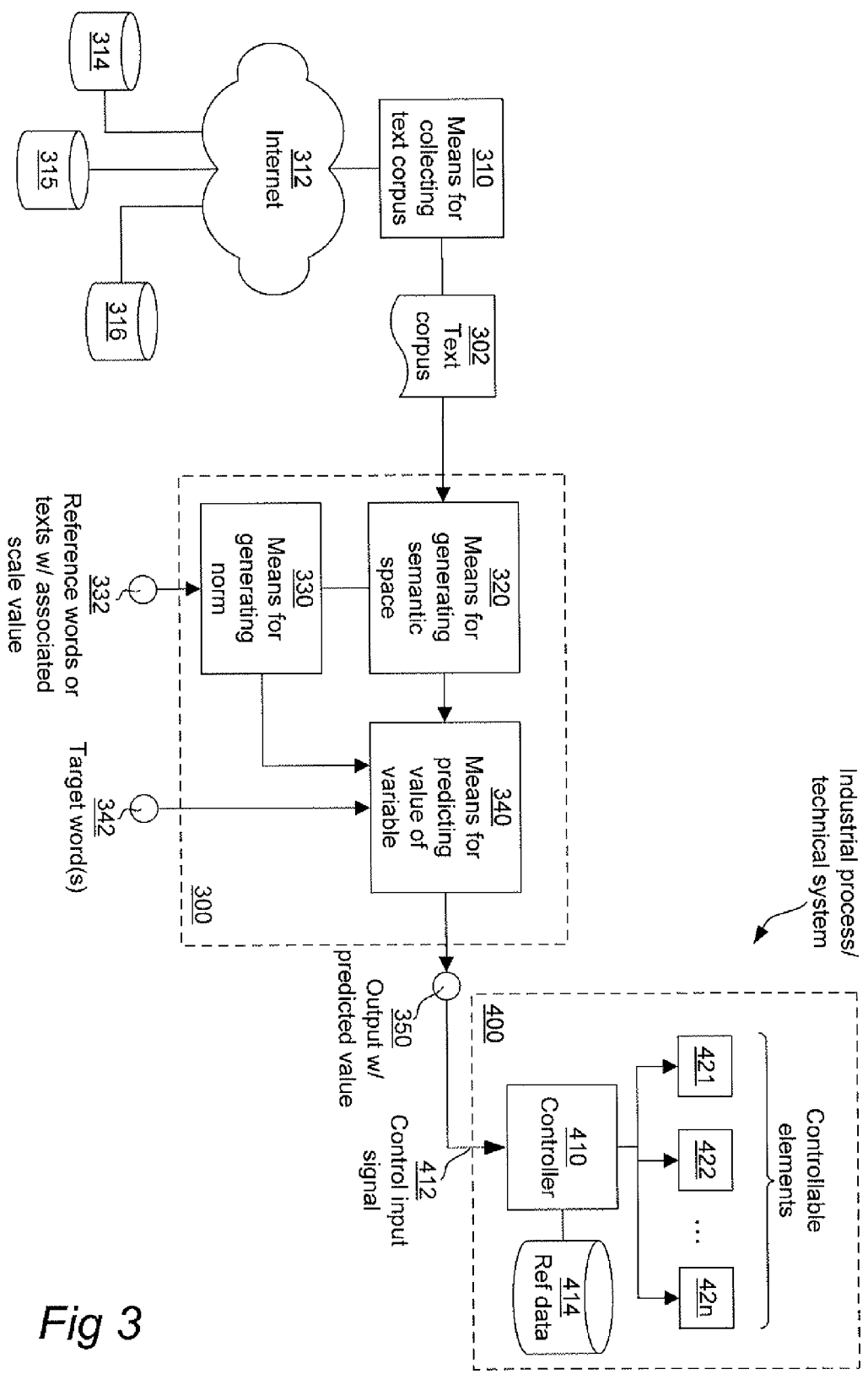
FIG. 3 is a schematic block diagram of an apparatus for providing a control input signal for an industrial process or technical system having one or more controllable elements based upon semantic evaluations of text.
Figure 10:
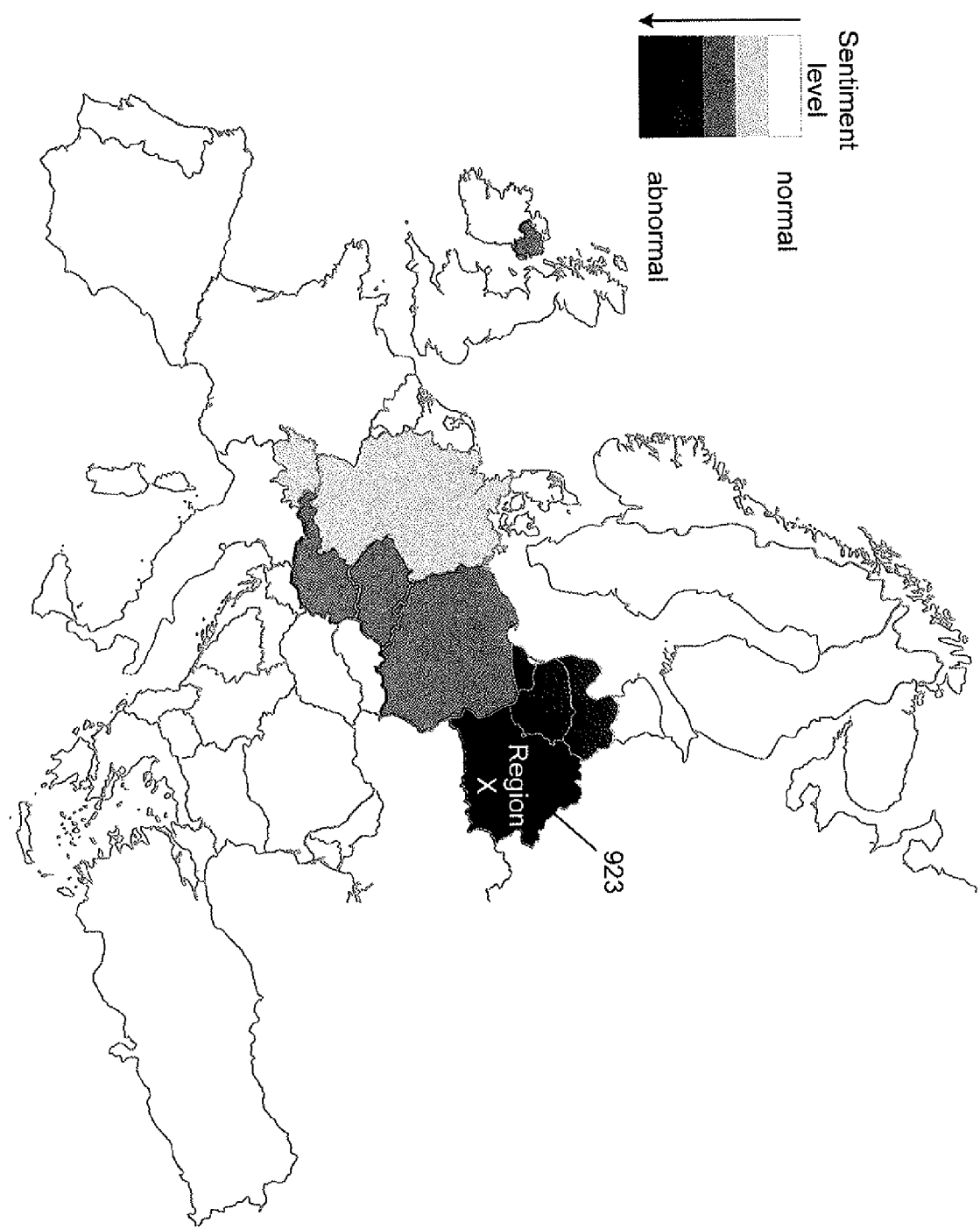
Figure 11:
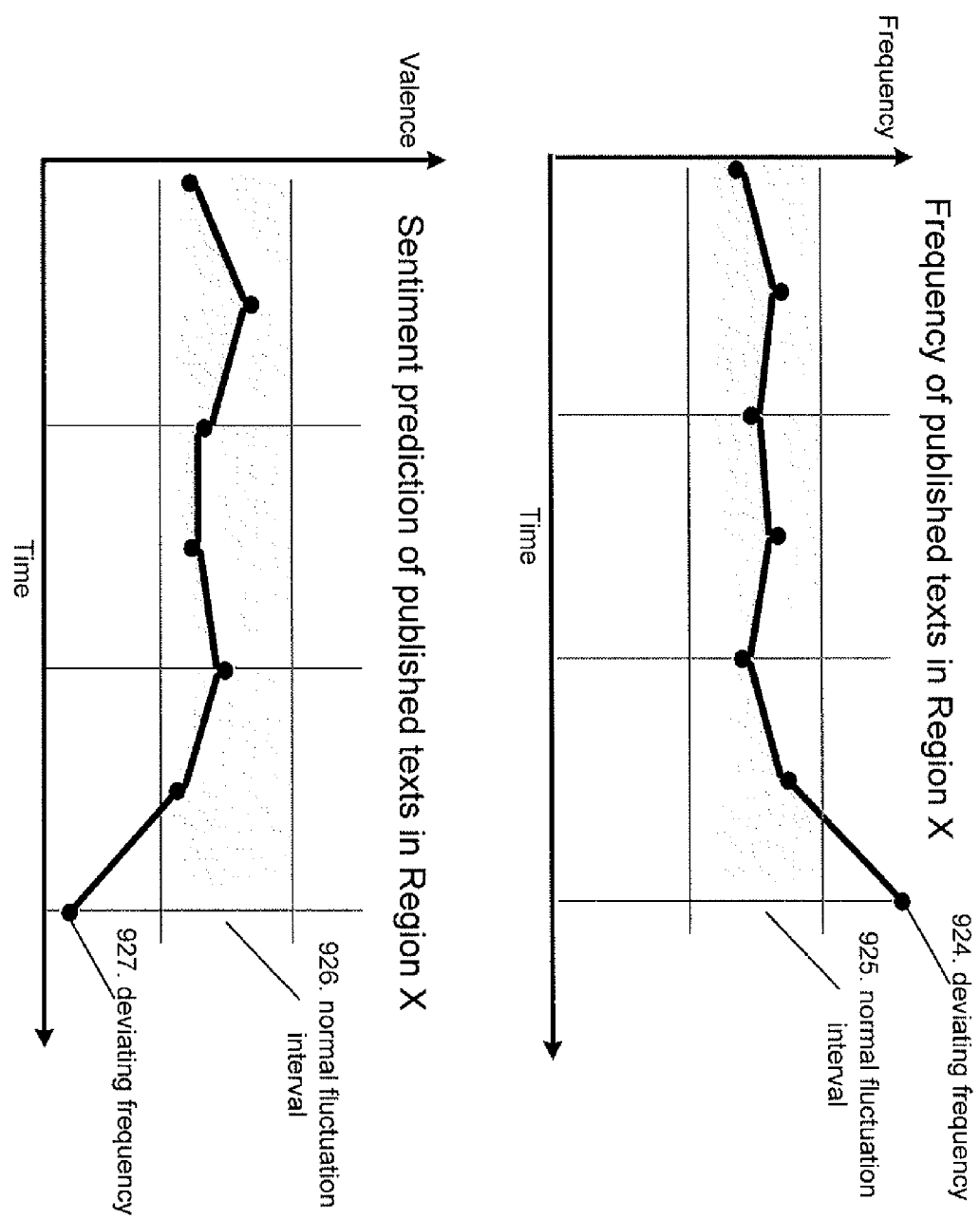

As seen in FIG. 3, an industrial process or a technical system 400 has a number of elements 421-42n which are controllable by a controller 410. The process or system 400 may for instance be a monitoring process, a manufacturing process, a logistic system, or—as will be referred to in more detail further below—a decision-making system (FIG. 8), for instance used in production of early-warning signals for large scale global events (FIGS. 10 and 11). The controllable elements 421-42n may be in any arbitrary number and consist of any combination of modules, units, components and subsystems known from all fields of technology and industry.

Non-limiting examples of controllable elements 421-42n are pumps, valves, gates, doors, hatches, latches, belts, engines, motors, drivers, switches, indicators, computer equipment, network equipment, telecom equipment, etc.

The controller 410 may essentially constitute any known controller technology, including but not limited to a processor (PLC, CPU, DSP), FPGA, ASIC or any other suitable digital and/or analogue circuitry capable of performing the functionality of controlling the controllable elements 421-42n.

To control the elements 421-42n, the controller 410 may be adapted to receive various control input signals generated by internal devices in the process or system 400. Such internal devices may for instance be sensors of any physical conditions, input devices capable of receiving input from human users or other processes or systems, etc. The control input signals to the controller 410 may also include externally generated signals, i.e. signals generated outside of the process or system 400. In FIG. 3, one such externally generated control input signal is indicated at 412. This control input signal 412 is received from an apparatus 300 which is adapted to generate the control input signal 412 based on semantic evaluations of text. As is well known per se, the controller 410 may also use reference data 414 as appropriate for determining—in view of the contents of the control input signals received—the particulars of the further control of the controllable elements 421-42n.

In analogy with what has been described above for the first aspect of the invention, the apparatus 300 is adapted to predict a value 350 of a variable associated with a read target word or set of words 342 by performing semantic evaluations based on text, and to provide the predicted value 350 in the control input signal 412 to the industrial process or technical system 400.

To this end, the apparatus 300 has means 320 for generating a semantic space for a text corpus 302. The text corpus may be collected by means 310 from a plurality of distributed text sources 314-316 which are accessible via one or more networks 312. Such network(s) may include a data communication network (such as a TCP/IP based network) which includes or is connected to the Internet, and/or a telecommunications network such as GSM, UMTS, D-AMPS, CDMA2000, FOMA or TD-SCDMA. The pieces of text collected or read from the distributed sources 314-316 may be communicated over available communication channels such as EDGE, GPRS, HSPA, email, HTTP, FTP, etc.

Figure 4:
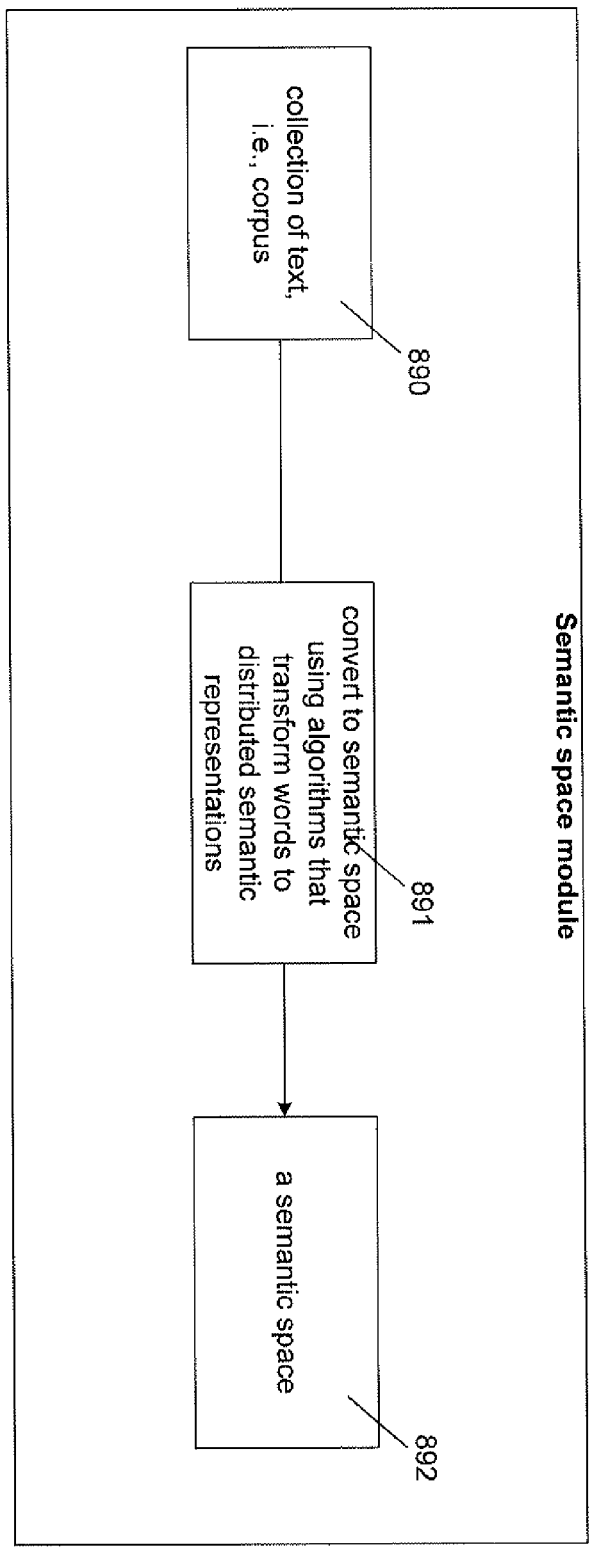
FIG. 4 is a detailed block diagram of a semantic space generating module which is comprised in the apparatus of FIG. 3.

One example of the means 320 for generating a semantic space is illustrated as a semantic space module in FIG. 4. The semantic space module has functionality 890 for collecting text, e.g. text corpus 302, and functionality 891 for converting the text corpus to a semantic space 892 using algorithms that transform words to distributed semantic representations.

The apparatus 300 also has means 330 for generating a norm from one or more reference words or texts 332. One example of the means 330 for generating a norm is illustrated as a norm module in FIG. 5. The norm module has access to the semantic space 892 generated by the semantic space module of FIG. 4. The norm module also receives at least one reference word or text 893 which is associated with a defined respective value 894 on a nominal, ordinal or relative (ratio) scale. As previously explained, such values may be defined either by human user(s), or by automatic procedures. The norm module also has functionality for calculating, for each received reference word or text 893, its location in the semantic space 892. The calculated location will then be stored as a reference point in the semantic space 892 together with the value 894 associated with the respective reference word or text 893. The result is thus a norm 896.

Figure 6:
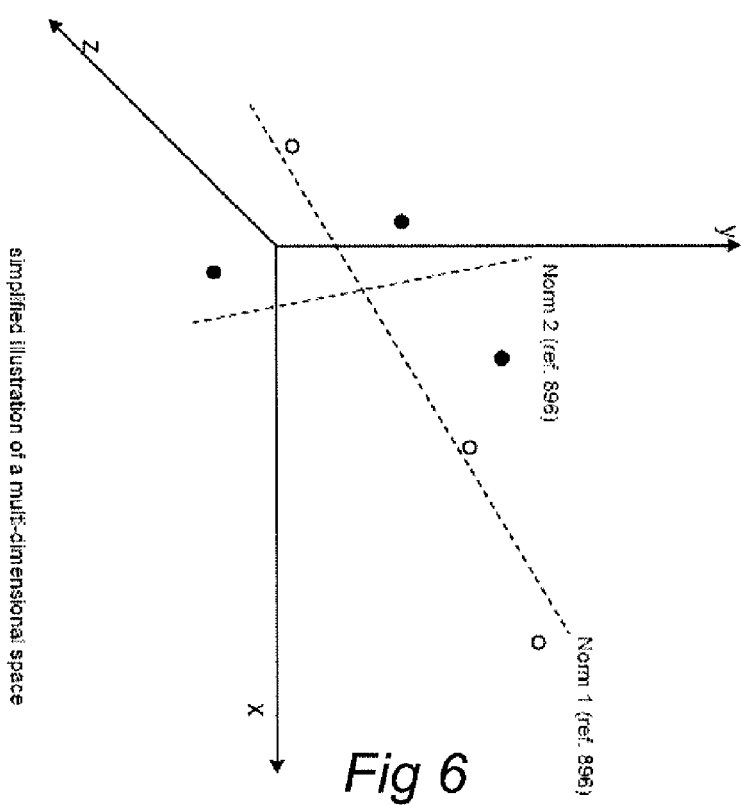
FIG. 6 is a diagram which serves to further illustrate the generation of norms.

The concept of a norm 896 is illustrated further in FIG. 6. At the upper left part of FIG. 6, the reference words/texts and automatically generated values (in the form of sales figure values) are illustrated for a first norm ("norm 1"). As is seen to the right in FIG. 6, this results in a set of three reference points (empty circles) in the semantic space 892. The norm can be seen as an imaginary line which best approximates these three reference points (this analogy being considerably simplified; the number of dimensions may be very large). At the lower left part of FIG. 6, the values for the reference words/texts are instead defined by human user(s), here in the form of valence values on a scale from 0 to 10. Again, to the right in FIG. 6 there is shown the resulting set of three reference points (solid circles) in the semantic space 892, describing a second norm ("norm 2").

Referring back to FIG. 3, the apparatus 300 further has means 340 for predicting the value 350 of a variable associated with a target word 342 based on the semantic space and the norm. One example of the means 340 for predicting the value 350 of a variable is illustrated as a prediction module in FIG. 7.

Figure 5:
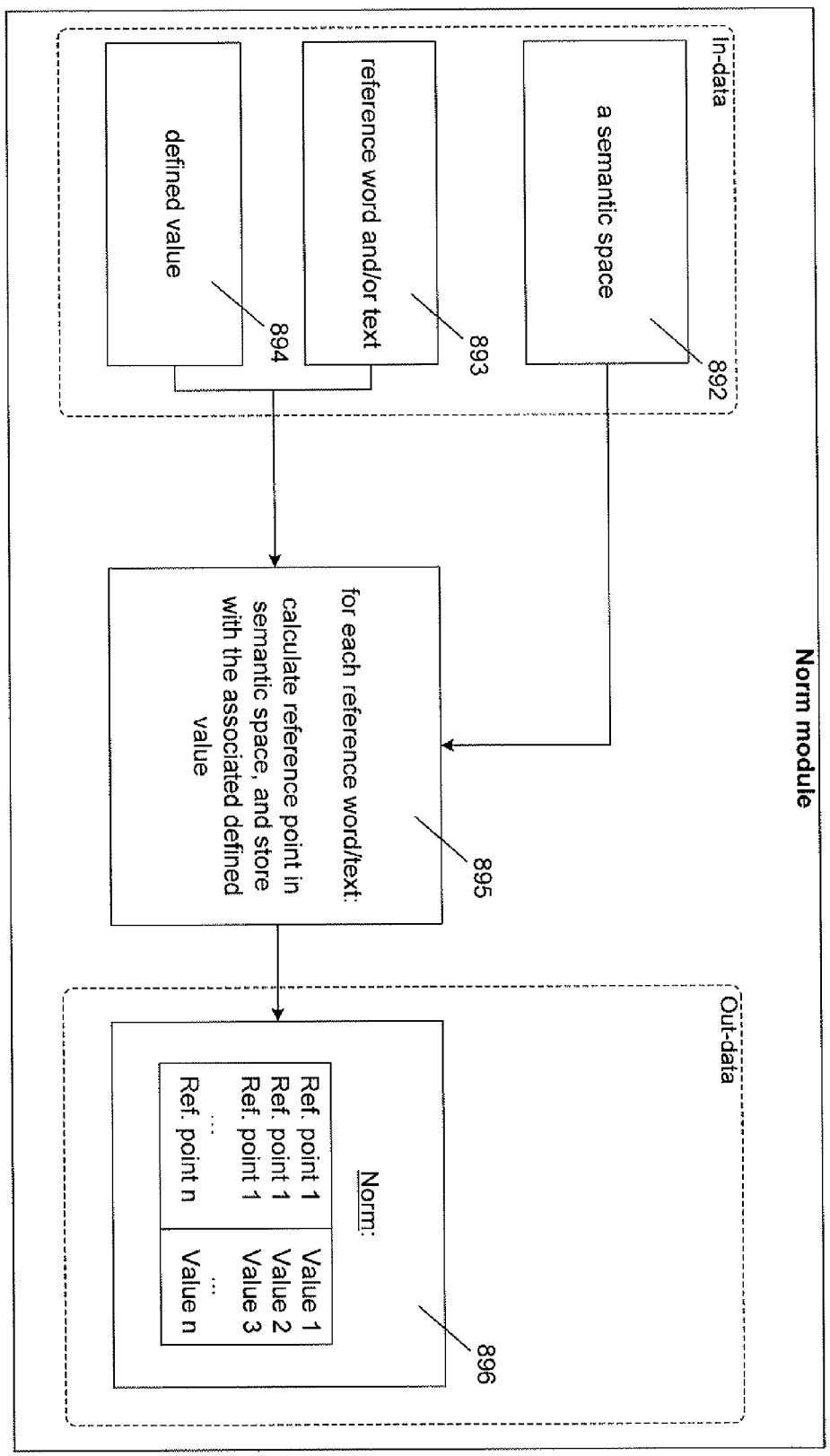
FIG. 5 is a detailed block diagram of a norm generating module which is comprised in the apparatus of FIG. 3.
Figure 7:
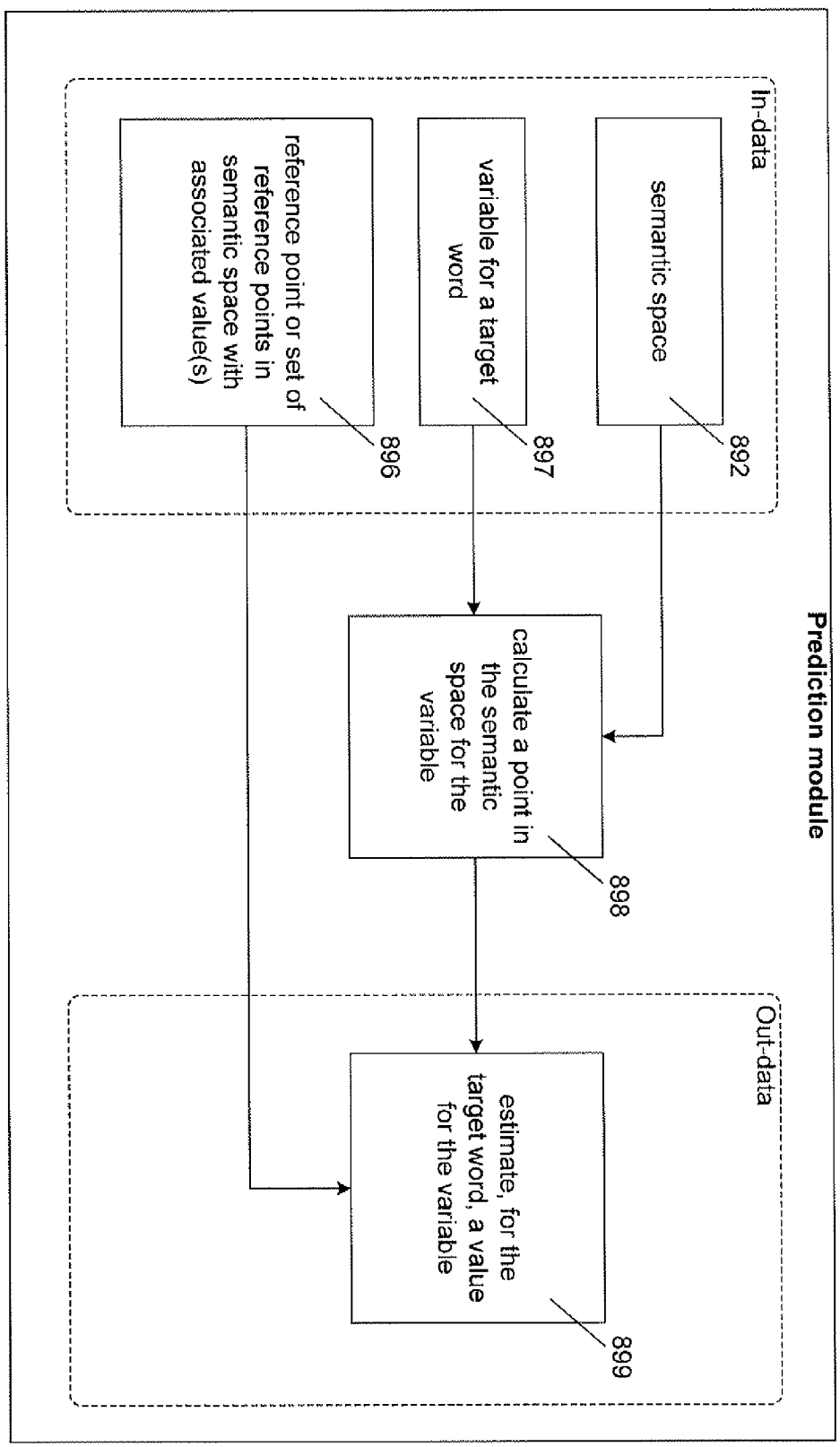
FIG. 7 is a detailed block diagram of a prediction module which is comprised in the apparatus of FIG. 3.

In FIG. 7, the prediction module accepts as input the semantic space 892 as generated by the semantic space module of FIG. 4, the variable 897 associated with the target word 342, and the norm 896 as generated by the norm module of FIG. 5. The prediction module has functionality 898 for calculating a point in the semantic space 892 for the variable 897. Further, the prediction module has functionality 899 for estimating, for the target word 342, a value 350 for the variable 897. For details of these functionalities, reference is made to the preceding descriptions in this document.

Thus, the predicted value 350 of the variable 897 is finally provided in the aforementioned control input signal 412 to the industrial process or technical system 400.

The apparatus 300 according to the second aspect of the invention may comprise a data processing unit (not shown in FIG. 3) which—together with appropriate programming in software, middleware or hardware (or any combination thereof)—implements the means 320-340 as described above. The data processing unit may essentially be of any suitable processing device technology, including but not limited to a processor (PLC, CPU, DSP), FPGA, ASIC or any other suitable digital and/or analogue circuitry capable of performing the disclosed functionality. In one embodiment, the data processing unit of the apparatus 300 is configured to perform the method according to the first aspect of the invention (described above with reference to FIGS. 1 and 2).

Figure 8:
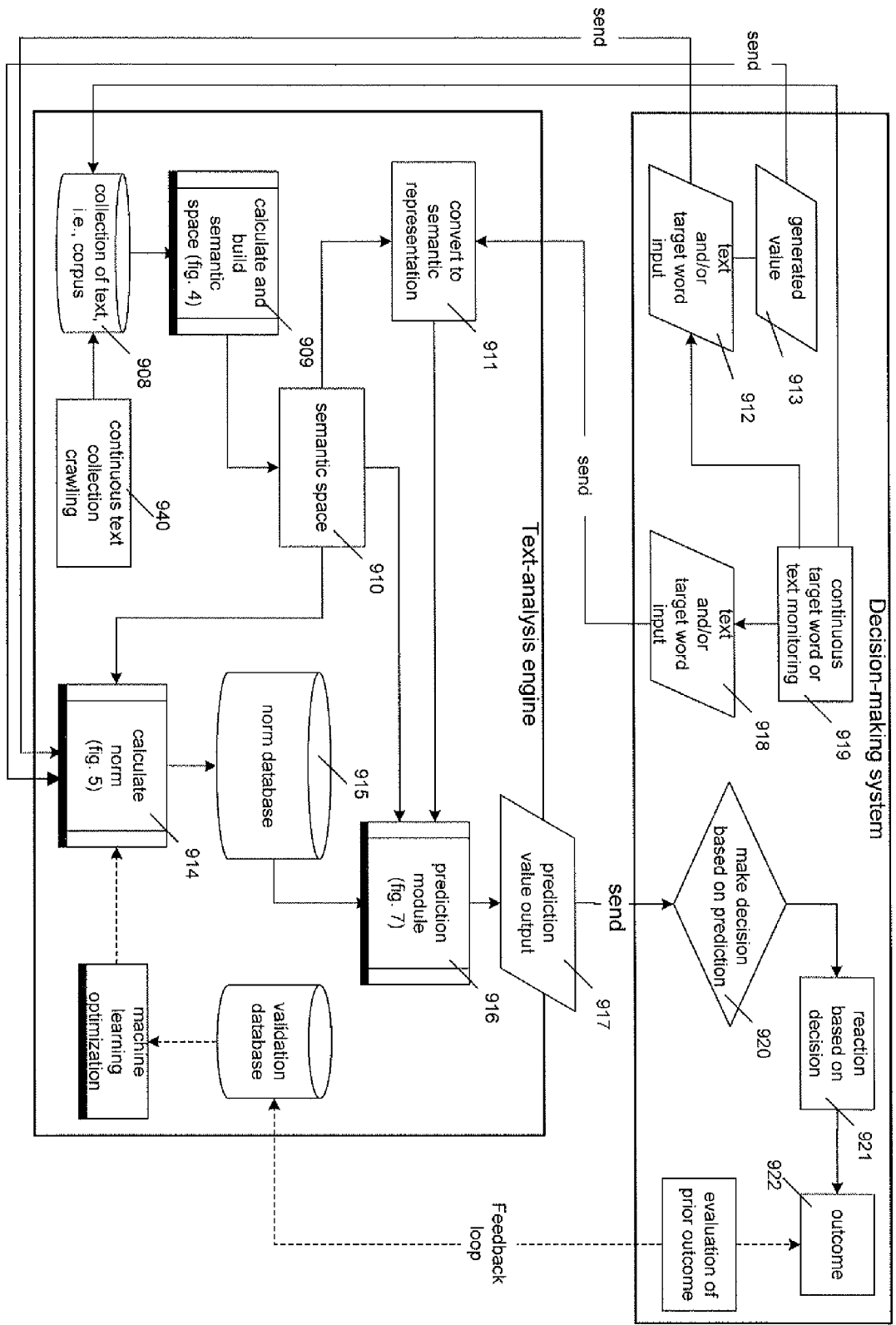
FIG. 8 is a schematic block diagram of a decision-making system and text-analysis engine as one possible implementation of the apparatus and the technical system shown in FIG. 3.

FIG. 8 illustrates a possible implementation of the apparatus 300 and the technical system 400 of FIG. 3 in the form of a decision-making system which interacts with a text-analysis engine. Thus, in FIG. 8, the apparatus 300 is implemented as a text-analysis engine having a module 909 for calculating and building a semantic space 910 upon a collection of text 908 (the module 909 corresponding to means 320 of FIG. 3 and the semantic space module of FIG. 4). The text-analysis engine also has a module 914 for calculating a norm to be stored in a norm database 915 (this module 914 corresponding to means 330 of FIG. 3 and the norm module of FIG. 5). Further, the text-analysis engine has a prediction module 916 capable of providing a prediction value output 917 which is sent as a control input signal to the decision-making system (the module 916 corresponding to means 340 of FIG. 3 and the prediction module of FIG. 7). Other elements of the decision-making system and text-analysis engine of FIG. 8 will be described in the following two use-cases.

Use-case A

In use-case A, three articles containing the product name "The Phone" is published. The first article, which contains the text "The Phone is complicated", is published on day one (see 900 in FIG. 9) and is preceding a shipment of 2000 units of the product "The Phone" on day two (901 in FIG. 9). The second article, which contains the text "The Phone is yellow", is published on day three (903 in FIG. 9) and is preceding a shipment of 3500 units of the product "The Phone" on day four (904 in FIG. 9). Finally, the third article is published on day five (906 in FIG. 9).

The decision-making system is alerted on day five by a module 919 in FIG. 8 which continuously monitors the target word "The Phone". In response, the decision-making system is given a task to predict an optimal amount of units of the product "The Phone" to be shipped on day six (907 in FIG. 9). The following four steps are then executed by the decision-making system in order to obtain a predicted number of units to ship on day six and to ship the predicted amount of units to a certain location, namely "The Store".

In step 1, the decision-making system first tasks the module 909 of FIG. 8 in the text-analysis engine with creating a semantic space 910 using LSA, considering that no fitting space is currently present in the text-analysis engine. In this case, a text collection 908, which is presented in table 4 below, is used when creating the semantic space 910 by module 909.

TABLE 4 text collection

| Document (d) | Text |
|---|---|
| 1 | Tiny is good |
| 2 | Tiny is light |
| 3 | Bad software is slow |
| 4 | Software is complicated |
| 5 | Yellow is trendy |
| 6 | Trendy is good |

The text collection in table 4 is converted by module 909 in the text-analysis engine to a context by word frequency table of the words included, where the words are represented in the rows and the contexts in the columns, as presented in table 5 below.

TABLE 5 word frequency (a) matrix

| Word | d1 | d2 | d3 | d4 | d5 | d6 |
|---|---|---|---|---|---|---|
| tiny | 1 | 1 | 0 | 0 | 0 | 0 |
| is | 1 | 1 | 1 | 1 | 1 | 1 |
| light | 0 | 1 | 0 | 0 | 0 | 0 |
| bad | 0 | 0 | 1 | 0 | 0 | 0 |
| software | 0 | 0 | 1 | 1 | 0 | 0 |
| slow | 0 | 0 | 1 | 0 | 0 | 0 |
| complicated | 0 | 0 | 0 | 1 | 0 | 0 |
| yellow | 0 | 0 | 0 | 0 | 1 | 0 |
| trendy | 0 | 0 | 0 | 0 | 1 | 1 |
| good | 1 | 0 | 0 | 0 | 0 | 1 |

After this, the word frequency matrix in table 5 is converted by module 909 of the text-analysis engine to a semantic space (u) using singular value decomposition (SVD), as presented in table 6. In table 6, and the subsequent tables, values are rounded to two decimal digits.

TABLE 6 semantic space (u) matrix

| Word | d1 | d2 | d3 | d4 | d5 | d6 |
|---|---|---|---|---|---|---|
| tiny | 0.55 | 0.43 | −0.04 | 0.07 | 0.43 | 0.55 |
| is | 1.06 | 0.93 | 1.06 | 0.93 | 0.93 | 1.06 |
| light | 0.24 | 0.19 | 0.02 | 0.05 | 0.19 | 0.24 |
| bad | −0.05 | 0.02 | 0.67 | 0.46 | 0.02 | −0.05 |
| software | −0.04 | 0.07 | 1.13 | 0.79 | 0.07 | −0.04 |
| slow | −0.05 | 0.02 | 0.67 | 0.46 | 0.02 | −0.05 |
| complicated | 0.02 | 0.05 | 0.46 | 0.33 | 0.05 | 0.02 |
| yellow | 0.24 | 0.19 | 0.02 | 0.05 | 0.19 | 0.24 |
| trendy | 0.55 | 0.43 | −0.04 | 0.07 | 0.43 | 0.55 |
| good | 0.62 | 0.48 | −0.11 | 0.03 | 0.48 | 0.62 |

Then, (u) is approximated by module 909 in the text-analysis engine to two columns, as presented in table 7:

TABLE 7 approximated (u) matrix

| Word | (u) col 1 | (u) col 2 |
|---|---|---|
| tiny | −0.26 | 0.3 |
| is | −0.79 | 0 |
| light | −0.12 | 0.11 |
| bad | −0.14 | −0.37 |
| software | −0.26 | −0.59 |
| slow | −0.14 | −0.37 |
| complicated | −0.12 | −0.23 |
| yellow | −0.12 | 0.11 |
| trendy | −0.26 | 0.3 |
| good | −0.28 | 0.37 |

Following this, (u) is normalized by the text-analysis engine to a completed semantic space (910 in FIG. 8) to (u'), as presented in table 8:

TABLE 8 a normalized semantic space (u') matrix

| Word | (u') col 1 | (u') col 2 |
|---|---|---|
| tiny | −0.67 | 0.75 |
| is | −1 | 0 |
| light | −0.74 | 0.67 |
| bad | −0.36 | −0.93 |
| software | −0.41 | −0.91 |
| slow | −0.36 | −0.93 |
| complicated | −0.48 | −0.88 |
| yellow | −0.74 | 0.67 |
| trendy | −0.67 | 0.75 |
| good | −0.61 | 0.79 |

In the second step, a module 912 in the decision-making system tasks the text-analysis engine with calculating a norm (module 914 in FIG. 8) based on the first (900 in FIG. 9) and second (903 in FIG. 9) articles as reference texts. A module 913 automatically determines that the first article (first reference text) is associated with a shipment manifest of 2000 units (901 in FIG. 9) and that the second article (second reference text) is associated with a shipment manifest of 3500 units (904 in FIG. 9).

In this case, two texts, as presented in table 9, are therefore used when creating a set of reference points in the normalized semantic space presented in table 8.

TABLE 9 reference texts associated with respective values

| Text | Value | Reference text associated with a value |
|---|---|---|
| The Phone is complicated | 2000 | "is complicated" associated with value 2000 |
| The Phone is yellow | 3500 | "is yellow" associated with value 3500 |

The text-analysis engine then discards the target word "The Phone" from the two texts presented in table 9. Then module 914 of the text-analysis engine calculates a set of reference points in the semantic space presented in table 8 based of the reference text "is complicated" and the reference text "is yellow", as presented in tables 10 and 11.

TABLE 10 conversion of text "is complicated" to a semantic reference point in the semantic space in table 8

| | (u) col 1 | (u) col 2 | (u') col 1 | (u') col 2 |
|---|---|---|---|---|
| is | −0.79 | 0 | | |
| complicated | −0.12 | −0.23 | | |
| is + complicated | −0.92 | −0.23 | −0.97 | −0.24 |

TABLE 11 conversion of text "is yellow" to a semantic reference point in the semantic space in table 8

| | (u) col 1 | (u) col 2 | (u') col 1 | (u') col 2 |
|---|---|---|---|---|
| is | −0.79 | 0 | | |
| yellow | −0.12 | 0.11 | | |
| is + yellow | −0.92 | 0.11 | −0.99 | 0.12 |

The two reference points presented in tables 10 and 11, with associated values of 2000 and 3500, respectively, are saved in the norm database 915 as a completed norm.

The third step is to predict a result value. To this end, the decision-making system tasks the prediction module 916 in the text-analysis engine with predicting a result value based on the third article published (906 in FIG. 9). In this case, a prediction is made on the basis of the text and target word presented in table 12:

TABLE 12 text and target word

| Text | Target word |
|---|---|
| The Phone is tiny but slow | The Phone |

The text-analysis engine then discards the target word from the text in table 12. The word "but" is also discarded from the text presented in table 12, because it is not present in the semantic space 910, as presented in table 8. Then the text-analysis engine creates a semantic representation 911 based on the remaining text "is tiny slow", as presented in table 13.

TABLE 13 convert text "is tiny slow" to a semantic point in the semantic space in table 8

|              | (u) col 1 | (u) col 2 | (u') col 1 | (u') col 2 |
|--------------|-----------|-----------|------------|------------|
| is           | −0.79     | 0         |            |            |
| tiny         | −0.26     | 0.3       |            |            |
| slow         | −0.14     | −0.37     |            |            |
| is + tiny + slow | −1.2  | −0.07     | −1         | −0.06      |

Figure 9:
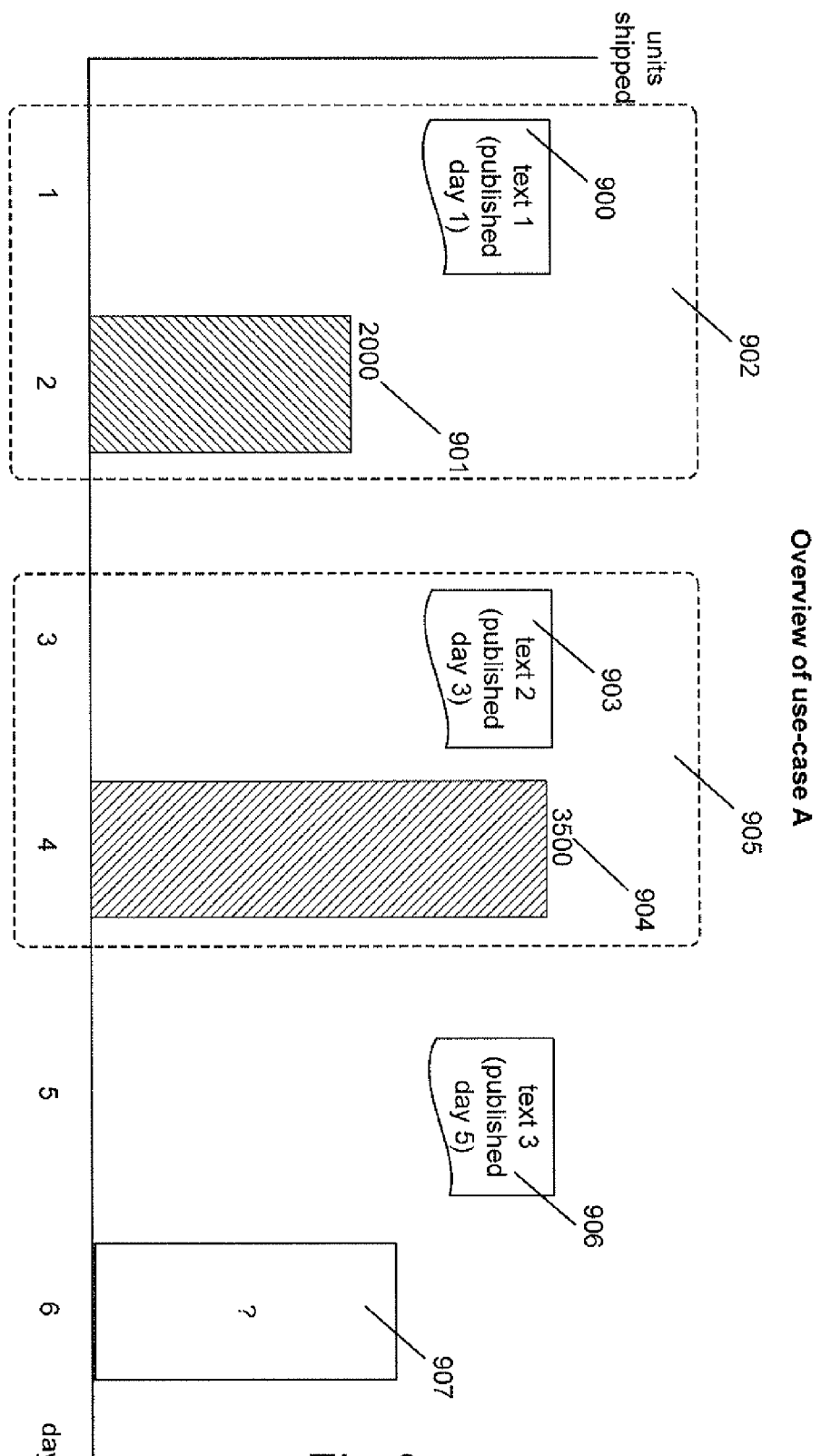
FIG. 9 illustrates a first use case of the decision-making system and text-analysis engine shown in FIG. 8, and FIGS. 10 and 11 illustrate a second use case of the decision-making system and text-analysis engine shown in FIG. 8.

At this stage, the text-analysis engine has all the information it needs in order to predict an optimal shipment manifest for day six (907 in FIG. 9). The text-analysis engine thus executes a linear system of equations that gives the following coefficients:

$$-0.97X + -0.24Y = 2000$$

$$-0.99X + 0.12Y = 3500$$

gives $X = -3051$ $Y = 3997$

This gives the following prediction for "is tiny slow":

$$-1X - 0.06Y = 2811$$

Then, the final task for the text-analysis engine is to send the predicted value to the decision-making system (see 917 in FIG. 8).

The last step is to make a decision based on the predicted value. After receiving the predicted value from the text-analysis engine, a decision module 920 in the decision-making system checks how many products are in storage and how many are in "The Store". Then, module 920 makes a decision as regards how many units of the product "The Phone" that is optimal to ship.

Continuing with the example, "The Store" had 33 units left in storage and 4502 units were present in the shipping warehouse. Thus, a reaction module 921 in the decision-making system calculates that 2811−33 units are to be shipped to "The Store". Finally, an activation module 922 in the decision-making system activates a shipment of 2778 units to "The Store".

Use-case B

In use-case B, the decision-making system of FIG. 8 is tasked with monitoring a geographical region named "Region X" (see 923 in FIG. 10) in order to detect early warning signals coming from that region.

Early warning signals are, in this case, detection of conflicts, natural disasters or other large scale events which indirectly lead to abnormal patterns for how articles are written (see 927 in FIG. 11) and how often they are published (924 in FIG. 11).

In this case, a suitable semantic space 910 is assumed to be present in the text-analysis engine. Thus, it is not necessary to create a new space before starting to produce a prediction value output at 917 in FIG. 8. A database 915 with norms (896 in FIG. 5) containing words or text classified as positive or negative on a scale is also present in the text-analysis engine.

Articles in Region X are continuously collected by a module 940 in the text-analysis system into a text corpus 908, and sentiment predictions are made instantly after publication on all collected articles in Region X (modules 919, 911, 916, and 917 of FIG. 8).

The decision module 920 of the decision-making system then performs mass-analysis of the prediction outcome 917 over time by calculating a frequency weighted average and the corresponding variance for predictions made every minute. The decision-making system also collects statistics for how often articles are published each minute. This information is received from the text-analysis engine with the prediction output 917.

Thus, the decision-making system will produce a normal fluctuation pattern for both sentiment (see 926 in FIG. 11) and frequency of published text (925 in FIG. 11) in Region X after running for a day. After one day, the decision-making system will start to produce warning signals if the mass-analysis of the prediction value output 917 made every minute, with a corresponding mass-analysis of publication frequency, deviates from a normal pattern for how articles are written (927 in FIG. 11) and how often they are published (924 in FIG. 11).

A warning signal produced by the decision module 920 in the decision-making system will be used by the reaction module 921 to automatically instruct the activation module 922 to trigger a satellite that subsequently moves into a global position where it can monitor the region in question (i.e., Region X).

\* \* \*

Although various embodiments of the invention have been described and shown, the invention is not restricted thereto, but may also be embodied in other ways within the scope of the subject-matter defined in the following claims.

The invention claimed is:

1. A method for predicting a value of a variable associated with a target word or set of words, performed on at least one computer and comprising the steps of:
    collecting a text corpus comprising a set of words that include the target word,
    generating a representation of the text corpus,
    creating a semantic space for the set of words, based on the representation of the text corpus,
    defining, for a location in the semantic space, a value of the variable,
    estimating, for the target word, a value of the variable, based on the semantic space and the defined variable value of the location in the semantic space, and
    calculating, by the computer, a predicted value of the target word, on basis of the semantic space, the defined variable value of the location in the semantic space and the estimated variable value of the target word,
    wherein the estimating of the target word variable value comprises performing regression analysis having the target word variable value as a dependent variable.

2. A method according to claim 1, wherein the creating of the semantic space comprises performing a singular value decomposition on the representation of the text corpus.

3. A method according to claim 1, further comprising the step of statistically testing the predicted value of the variable, by comparing the predicted value with known values.

4. A method according to claim 1, further comprising the step of statistically testing if two sets of words or two sets of documents of the text corpora differ in semantic representation.

5. A method according to claim 1, wherein the collecting of the text corpus comprises collecting time information associated with text in the text corpus.

6. A method according to claim 5, wherein the predicting of the value of the variable comprises associating the predicted value with the time information of the text corpus.

7. A method according to claim 1, wherein the collecting of the text corpus comprises collecting a relevance indicating measure associated with text in the text corpus.

8. A method according to claim 7, wherein the predicting of the value of the variable comprises numerically weighting the value with the relevance indicating measure.

9. An apparatus (300) for providing a control input signal (412) for an industrial process or technical system (400) having one or more controllable elements (421-42n), the apparatus comprising:
   means (320; 909) for generating a semantic space (892) for a text corpus (302; 908);
   means (330; 914) for generating a norm (896) from one or more reference words or texts (332; 893), the or each reference word or text being associated with a defined respective value on a scale, and the norm being calculated as a reference point or set of reference points in the semantic space for the or each reference word or text with its associated respective scale value;
   means (340) for reading at least one target word;
   means (340) for predicting a value (350) of a variable associated with the target word based on the semantic space and the norm; and
   means (340) for providing the predicted value in a control input signal (412) to said industrial process or technical system (400),
   wherein the predicting of the target word variable value comprises performing regression analysis having the target word variable value as a dependent variable.

10. An apparatus as defined in claim 9, further comprising means (310) for collecting said digital text corpus from a plurality of distributed text sources (314-316) accessible via one or more networks (312).

11. An apparatus as defined in claim 9, further comprising a data processing unit, wherein said data processing unit is configured to perform a method for predicting a value of a variable associated with a target word or set of words, performed on at least one computer and comprising the steps of:
   collecting a text corpus comprising a set of words that include the target word,
   generating a representation of the text corpus,
   creating a semantic space for the set of words, based on the representation of the text corpus,
   defining, for a location in the semantic space, a value of the variable,
   estimating, for the target word, a value of the variable, based on the semantic space and the defined variable value of the location in the semantic space, and
   calculating a predicted value of the target word, on basis of the semantic space, the defined variable value of the location in the semantic space and the estimated variable value of the target word.

12. A system for predicting a value of a variable associated with a target word or set of words, comprising at least one computer and configured to:
   collect a text corpus comprising a set of words that include the target word,
   generate a representation of the text corpus,
   create a semantic space for the set of words, based on the representation of the text corpus,
   define, for a location in the semantic space, of a subset of the words, a value of the variable,
   estimate, for the target word, a value of the variable, based on the semantic space and the defined variable value of the location in the semantic space, and
   calculate a predicted value of the target word, on basis of the semantic space, the defined variable value of the location in the semantic space and the estimated variable value of the target word,
   wherein the estimate of the target word variable value comprises performing regression analysis having the target word variable value as a dependent variable.

13. A system according to claim 12, wherein the creating of the semantic space comprises performing a singular value decomposition on the representation of the text corpus.

14. A system according to claim 12, further configured for statistically testing the predicted value of the variable, by comparing the predicted value with known values.

15. A system according to claim 12, further configured for statistically testing if two sets of words or two sets of documents of the text corpora differ in semantic representation.

16. A system according to claim 12, wherein the collecting of the text corpus comprises collecting time information associated with text in the text corpus.

17. A system according to claim 16, wherein the predicting of the value of the variable comprises associating the predicted value with the time information of the text corpus.

18. A system according to claim 12, wherein the collecting of the text corpus comprises collecting a relevance indicating measure associated with text in the text corpus.

19. A system according to claim 18, wherein the predicting of the value of the variable comprises numerically weighting the value with the relevance indicating measure.

20. A non-transitory computer readable medium having stored thereon a computer program having software instructions which when run on a computer cause the computer to perform the steps of:
   collecting a text corpus comprising a set of words that include the target word,
   generating a representation of the text corpus,
   creating a semantic space for the set of words, based on the representation of the text corpus,
   defining, for a location in the semantic space, a value of the variable,
   estimating, for the target word, a value of the variable, based on the semantic space and the defined variable value of the location in the semantic space, and
   calculating a predicted value of the target word, on basis of the semantic space, the defined variable value of the location in the semantic space and the estimated variable value of the target word,
   wherein the estimating of the target word variable value comprises performing regression analysis having the target word variable value as a dependent variable.

21. A method for predicting a value of a variable associated with a target word or set of words, performed on at least one computer and comprising the steps of:
   collecting a text corpus comprising a set of words that include the target word,
   generating a representation of the text corpus,
   creating a semantic space for the set of words, based on the representation of the text corpus,
   defining, for a location in the semantic space, a value of the variable,
   estimating, for the target word, a value of the variable, based on the semantic space and the defined variable value of the location in the semantic space, and
   calculating, by the computer, a predicted value of the target word, on basis of the semantic space, the defined variable value of the location in the semantic space and the estimated variable value of the target word,
   wherein the collecting of the text corpus comprises collecting time information associated with text in the text corpus, and wherein the predicting of the value of the variable comprises associating the predicted value with the time information of the text corpus.

22. A method according to claim 21, wherein the creating of the semantic space comprises performing a singular value decomposition on the representation of the text corpus.

23. A method according to claim 21, further comprising the step of statistically testing the predicted value of the variable, by comparing the predicted value with known values.

24. A method according to claim 21, further comprising the step of statistically testing if two sets of words or two sets of documents of the text corpora differ in semantic representation.

25. A method according to claim 21, wherein wherein the collecting of the text corpus comprises collecting a relevance indicating measure associated with text in the text corpus.

26. A method according to claim 25, wherein the predicting of the value of the variable comprises numerically weighting the value with the relevance indicating measure.

27. An apparatus (300) for providing a control input signal (412) for an industrial process or technical system (400) having one or more controllable elements (421-42n), the apparatus comprising:
  means (320; 909) for generating a semantic space (892) for a text corpus (302; 908);
  means (330; 914) for generating a norm (896) from one or more reference words or texts (332; 893), the or each reference word or text being associated with a defined respective value on a scale, and the norm being calculated as a reference point or set of reference points in the semantic space for the or each reference word or text with its associated respective scale value;
  means (340) for reading at least one target word;
  means (340) for predicting a value (350) of a variable associated with the target word based on the semantic space and the norm; and
  means (340) for providing the predicted value in a control input signal (412) to said industrial process or technical system (400),
  wherein the means (320; 909) for generating the semantic space (892) for the text corpus (302; 908) includes collecting time information associated with text in the text corpus, and
  wherein the predicting of the value of the variable comprises associating the predicted value with the time information of the text corpus.

28. An apparatus as defined in claim 27, further comprising means (310) for collecting said digital text corpus from a plurality of distributed text sources (314-316) accessible via one or more networks (312).

29. An apparatus as defined in claim 27, further comprising a data processing unit, wherein said data processing unit is configured to perform a method for predicting a value of a variable associated with a target word or set of words, performed on at least one computer and comprising the steps of:
  collecting a text corpus comprising a set of words that include the target word,
  generating a representation of the text corpus,
  creating a semantic space for the set of words, based on the representation of the text corpus,
  defining, for a location in the semantic space, a value of the variable,
  estimating, for the target word, a value of the variable, based on the semantic space and the defined variable value of the location in the semantic space, and
  calculating a predicted value of the target word, on basis of the semantic space, the defined variable value of the location in the semantic space and the estimated variable value of the target word.

30. A system for predicting a value of a variable associated with a target word or set of words, comprising at least one computer and configured to:
  collect a text corpus comprising a set of words that include the target word,
  generate a representation of the text corpus,
  create a semantic space for the set of words, based on the representation of the text corpus,
  define, for a location in the semantic space, of a subset of the words, a value of the variable,
  estimate, for the target word, a value of the variable, based on the semantic space and the defined variable value of the location in the semantic space, and
  calculate a predicted value of the target word, on basis of the semantic space, the defined variable value of the location in the semantic space and the estimated variable value of the target word,
  wherein the collecting of the text corpus comprises collecting time information associated with text in the text corpus, and
  wherein the predicting of the value of the variable comprises associating the predicted value with the time information of the text corpus.

31. A system according to claim 30, wherein the creating of the semantic space comprises performing a singular value decomposition on the representation of the text corpus.

32. A system according to claim 30, further configured for statistically testing the predicted value of the variable, by comparing the predicted value with known values.

33. A system according to claim 30, further configured for statistically testing if two sets of words or two sets of documents of the text corpora differ in semantic representation.

34. A system according to claim 30, wherein the collecting of the text corpus comprises collecting a relevance indicating measure associated with text in the text corpus.

35. A system according to claim 34, wherein the predicting of the value of the variable comprises numerically weighting the value with the relevance indicating measure.

36. A non-transitory computer readable medium having stored thereon a computer program having software instructions which when run on a computer cause the computer to perform the steps of:
  collecting a text corpus comprising a set of words that include the target word,
  generating a representation of the text corpus,
  creating a semantic space for the set of words, based on the representation of the text corpus,
  defining, for a location in the semantic space, a value of the variable,
  estimating, for the target word, a value of the variable, based on the semantic space and the defined variable value of the location in the semantic space, and
  calculating a predicted value of the target word, on basis of the semantic space, the defined variable value of the location in the semantic space and the estimated variable value of the target word,
  wherein the collecting of the text corpus comprises collecting time information associated with text in the text corpus, and
  wherein the predicting of the value of the variable comprises associating the predicted value with the time information of the text corpus.

* * * * *